United States Patent [19]

Sarma

[11] Patent Number: 5,168,074
[45] Date of Patent: Dec. 1, 1992

[54] ACTIVE MATRIX LIQUID CRYSTAL DISPLAY FABRICATION FOR GRAYSCALE

[75] Inventor: Kalluri R. Sarma, Mesa, Ariz.

[73] Assignee: Honeywell Inc., Minneapolis, Minn.

[21] Appl. No.: 696,656

[22] Filed: May 7, 1991

Related U.S. Application Data

[62] Division of Ser. No. 410,185, Sep. 20, 1989.

[51] Int. Cl.[5] .............................. H01L 21/70
[52] U.S. Cl. ...................... 437/51; 437/47; 437/60; 148/DIG. 14
[58] Field of Search ............ 437/51, 47, 60, 204, 437/205, 919; 350/333, 337, 336, 334; 148/DIG. 14

[56] References Cited

U.S. PATENT DOCUMENTS

| | | | |
|---|---|---|---|
| 4,643,530 | 2/1987 | Yamazaki | 350/337 |
| 4,728,172 | 3/1988 | Cannella | 350/333 |
| 4,772,099 | 9/1988 | Kato et al. | 350/334 |
| 4,836,655 | 6/1989 | Yamazaki | 350/334 |
| 4,840,460 | 6/1989 | Bernot et al. | 350/333 |
| 4,853,296 | 8/1989 | Fukuyoshi | 350/336 |
| 4,863,574 | 9/1989 | Maurice et al. | 204/59 R |
| 4,869,576 | 9/1989 | Aoki et al. | 350/333 |

FOREIGN PATENT DOCUMENTS

| | | | |
|---|---|---|---|
| 0060425 | 3/1988 | Japan | 350/336 |
| 0092923 | 4/1988 | Japan | 350/334 |
| 0009425 | 1/1989 | Japan | 350/336 |
| 0084224 | 3/1989 | Japan | 350/336 |

OTHER PUBLICATIONS

A 220×220 pixel a-si TFT matrix transmission LCD; Suzuki et al; Proceedings of the SID; vol. 25, Jan., 1984; pp. 11–16.

Primary Examiner—Brian E. Hearn
Assistant Examiner—Michael Trinh
Attorney, Agent, or Firm—John G. Shudy, Jr.

[57] ABSTRACT

A structure and method of fabricating a active matrix display with halftone grayscale and wide viewing angle, having an active matrix array and a control capacitor array fabricated on separate substrates.

6 Claims, 14 Drawing Sheets

Fig. 13 ACTIVE MATRIX DISPLAY FABRICATION

ACTIVE MATRIX LIQUID CRYSTAL DISPLAY FABRICATION FOR GRAYSCALE

This application is a division of application Ser. No. 07/410,185 filed Sep. 20, 1989, pending.

FIELD OF INVENTION

The present invention relates to liquid crystal displays, and particularly to active matrix liquid crystal displays (AMLCDs). More particularly, the invention pertains to AMLCD fabrication having a grayscale with an improved viewing angle.

BACKGROUND OF THE INVENTION

AMLCDs with a flat form factor have a demonstrated potential for reducing the weight, volume, power requirement, and cost, as well as for providing enhanced reliability compared to those factors of conventional cathode ray tube (CRT) displays. However, one significant problem with AMLCD panels has been the difficulty in achieving grayscale with adequate viewing angle. A number of display applications require wide-viewing angle grayscale and, without this, applications of AMLCD panels will be severely restricted.

In related art, a method for generating grayscales in an AMLCD having a wide viewing angle and using a half-tone approach, already has been developed. Halftoning is accomplished by subdividing each pixel into a number of subpixels, and incorporating a control capacitor in series with each subpixel. The control capacitors act as voltage dividers. By using a proper choice of values for the control capacitors, the voltages across the subpixels are varied such that, as each subpixel is selected to be turned-on, the voltage across it is at or above saturation voltage, while the voltages across the unselected subpixels are at or below threshold voltage. For any gray level selected by varying the thin film transistor (TFT) source voltage, at the most, only one subpixel will be between the threshold voltage ($V_{th}$) and saturation voltage ($V_s$). This significantly reduces the viewing angle dependence of the pixel luminance and grayscale. The control capacitor capacitance that determines a particular voltage value of the selected pixel, is adjusted by variation in its area or thickness of the dielectric. In related art, the control capacitors and the active matrix array are fabricated at the same time on the same substrate.

One major problem with the related art approach is that design and processing trade-offs are required when fabricating an active matrix array having control capacitors on the same substrate. These trade-offs result in a detrimental effect on performance and yield. The active matrix substrate includes several thin films and processing steps. In the conventional active matrix substrate fabrication, the thin films, their thicknesses and the processing parameters are selected to optimize the performance and yield of the TFTs, and thus of the display. However, incorporation of control capacitors on the same substrate results in non-optimum film thicknesses or processing conditions for the TFT switching devices and/or the control capacitors.

The following instance illustrates a problem of related-art fabrication. The control capacitors, utilizing area variation as means for capacitance variation, require a second transparent conductive electrode, which is generally indium tin oxide (ITO). The second ITO layer is deposited after the TFT array fabrication is complete. For optimum ITO deposition conditions, the substrate will have to be heated in excess of 300° Centigrade (C.). But this high temperature cycle degrades the properties of the a-Si TFTs.

To minimize the total number of process steps in fabrication, the TFT passivation layer is also used as a dielectric in the control capacitors with area variation. The choice of the dielectric and its thickness for the TFT passivation layer are determined by the dielectric/semiconductor interface properties and the step coverage issues. However, the choice of the dielectric and its thickness for the control capacitors is determined by the needed capacitance values for the control capacitors. These requirements of the dielectric and its thickness for TFTs and the control capacitors are usually not in agreement, and thus trade-offs need to be made if the same dielectric layer is to be used for TFT passivation as well as for control capacitors. Similarly, while the dielectric in the TFT structure can be used in the fabrication of control capacitors with thickness variation, the dielectric thickness requirements for the TFT structure and the control capacitors are quite different.

Another problem is that the conventional approach of the related art increases the number of processing steps (masking levels) for the TFT substrate. A greater number of steps increases the defect levels in the display and lowers the manufacturing yield. Negligible defect levels and high manufacturing yields are essential for the success of AMLCD panels. So, because the yields and costs are adversely affected as the number of masking levels and the process steps is increased, the related art requires design and process trade-offs to minimize the number of mask levels required for the fabrication of the active matrix substrates. Accordingly, a need exists to develop a method of manufacturing the halftone grayscale displays with control capacitors that does not require design and process trade-offs with resulting performance and yield degradation. The present invention responds to that need by separating the control capacitors from the active matrix substrate and having the active matrix substrate fabrication be strictly conventional. The control capacitors are fabricated on a second substrate containing the common electrode. The separation of the active matrix array and the control capacitor array between the two display glass substrates, permits each array to be fabricated with conventional techniques under its own optimum conditions to achieve high performance and yield, and low cost.

SUMMARY OF THE INVENTION

The present invention is a structure and method of fabricating the active matrix displays with halftone grayscale and a wide viewing angle. In the related art, the subpixels are defined in the conventional active matrix. In the invention, the subpixels are defined by the common electrode substrate. The active matrix in the invention defines just the pixels. The invention includes separating the active matrix array from the control capacitor array. Splitting the fabrication and number of process steps between the active matrix substrate and the common electrode substrate, increases control over the manufacturing process, optimizes design parameters and permits noncritical, conventional fabrication.

BRIEF DESCRIPTION OF THE DRAWINGS

FIG. 3b is an electrical equivalent of the pixel in FIG. 3a.

DESCRIPTION OF THE PREFERRED EMBODIMENTS

Figure 1:
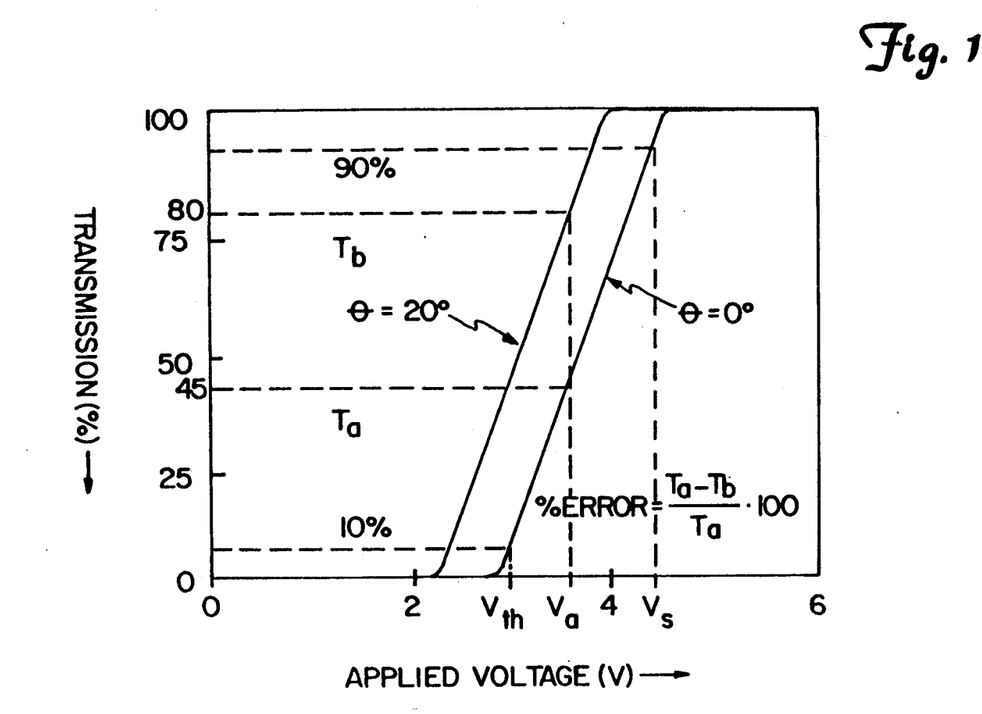
FIG. 1 is a graph revealing viewing angle dependence of transmission versus applied voltage of a typical twisted nematic liquid crystal display, with parallel polarizers.

FIG. 1 is a graph revealing viewing angle dependence of transmission versus applied voltage of a typical twisted nematic liquid crystal display with parallel polarizers. The graph indicates the percent of transmission (T) of a pixel versus applied voltage for a viewing angle ($\phi$) of 0 and 20 degrees relative to the display normal. For voltage $V_a$, the transmission $T_a$ for 0 degree viewing is about 45 percent and $T_b$ for 20 degree viewing is about 80 percent. This results in a grayscale error of $-78\%$, i.e., $((45-80)/45) \times 100\%$. Large grayscale errors limit the viewing angle. Voltage corresponding to a transmission of 10% is taken as the threshold voltage ($V_{th}$), and the voltage corresponding to 90% transmission is taken as the saturation voltage ($V_s$).

Figure 2A:
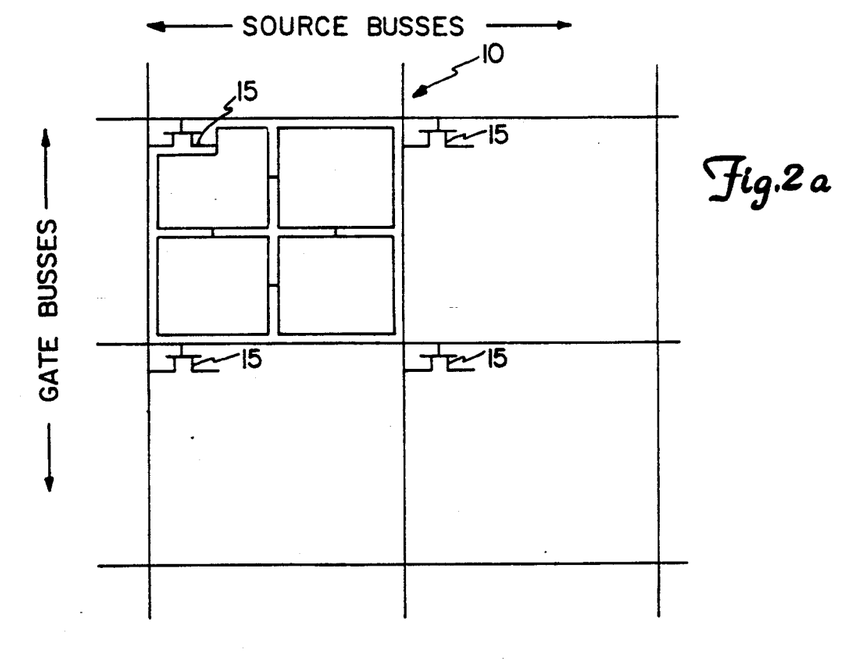
FIG. 2a is a schematic of a related art pixel.
Figure 2B:
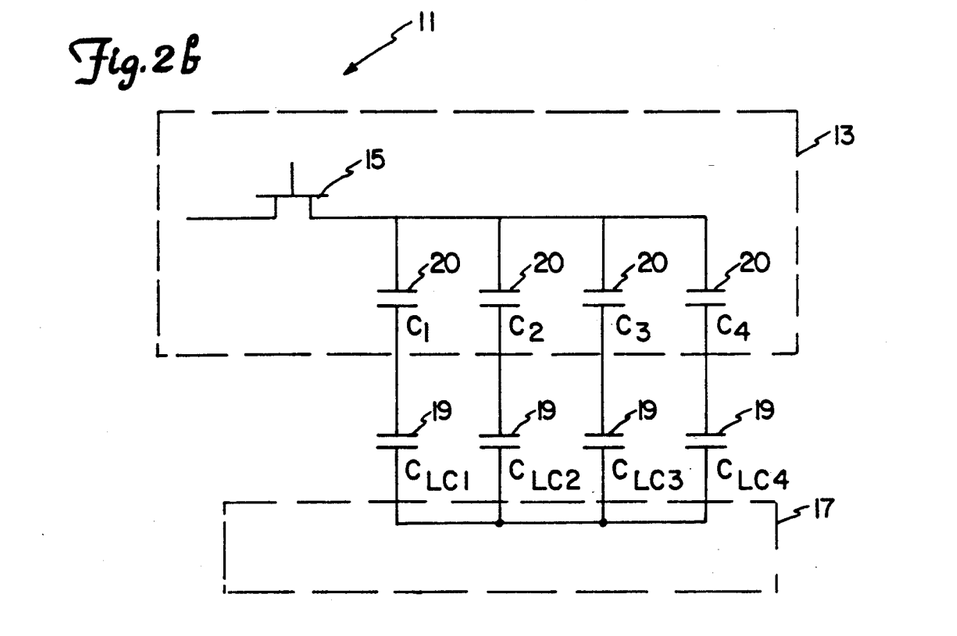
FIG. 2b is an electrical equivalent of the pixel in FIG. 2a, according to the related art.

FIG. 2a is a diagram of related-art active matrix array 10. FIG. 2b is a schematic of electrical equivalent 11 of the half-tone pixel in FIG. 2a. Thin film transistors (TFTs) 15 and control capacitors 20 are both fabricated on substrate 13. Common electrode substrate 17 is merely the common conductor. Capacitors 19 represent the capacitances between substrates 13 and 17, which is a consequence of the liquid crystal display pixels.

In the related art, there is a technique for generating grayscales in AMLCDs having a wide viewing angle, using a half-tone approach. The half-tone approach is based on the fact that the electro-optic response of liquid crystals is essentially independent of the viewing angle when the applied voltage is less than the threshold voltage, $V_{th}$, or greater than the saturation voltage, $V_s$, as illustrated in FIG. 1.

The pixel half-toning is accomplished by subdividing each pixel into a number of subpixels, and incorporating a control capacitor in series with each subpixel as shown in FIG. 2b. Control capacitors 20 and the active matrix array 10 are fabricated at the same time on same substrate 13. Control capacitors 20 act as voltage dividers. By using a proper choice of values for control capacitors 20, the voltages across the subpixels are varied such that, as each subpixel is selected to be turned-on, the voltage across it is at or above $V_s$, while the unselected pixels are at or below $V_{th}$. Thus, for any gray level selected by varying TFT 15 source voltage, at the most, only one subpixel voltage will be between $V_{th}$ and $V_s$. This significantly reduces the pixel luminance and grayscale dependencies on viewing angle. The control capacitor 20 capacitance is varied by variation in capacitor area or thickness of the dielectric in substrate 13.

Figure 3A:
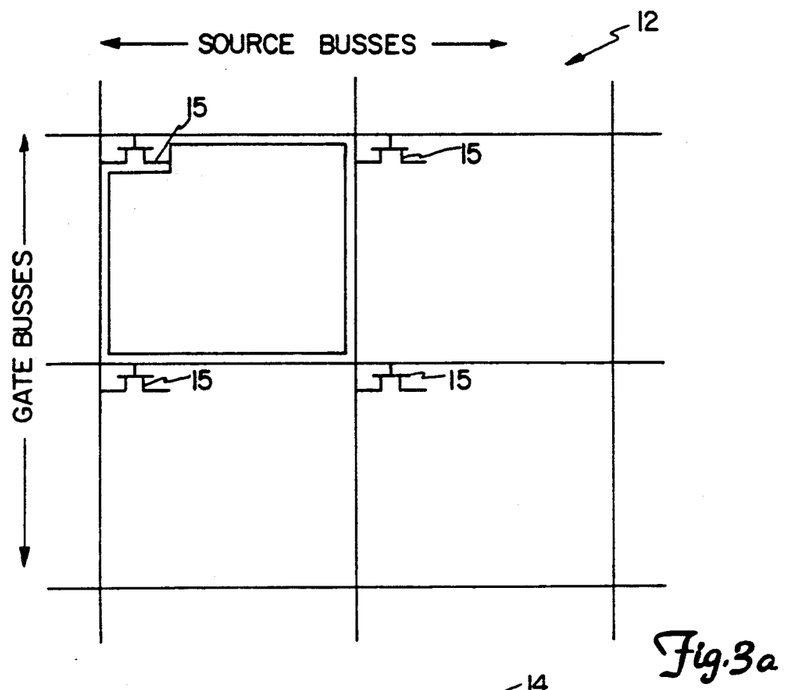
FIG. 3a is a schematic of the pixel as used in the present invention.
Figure 3B:
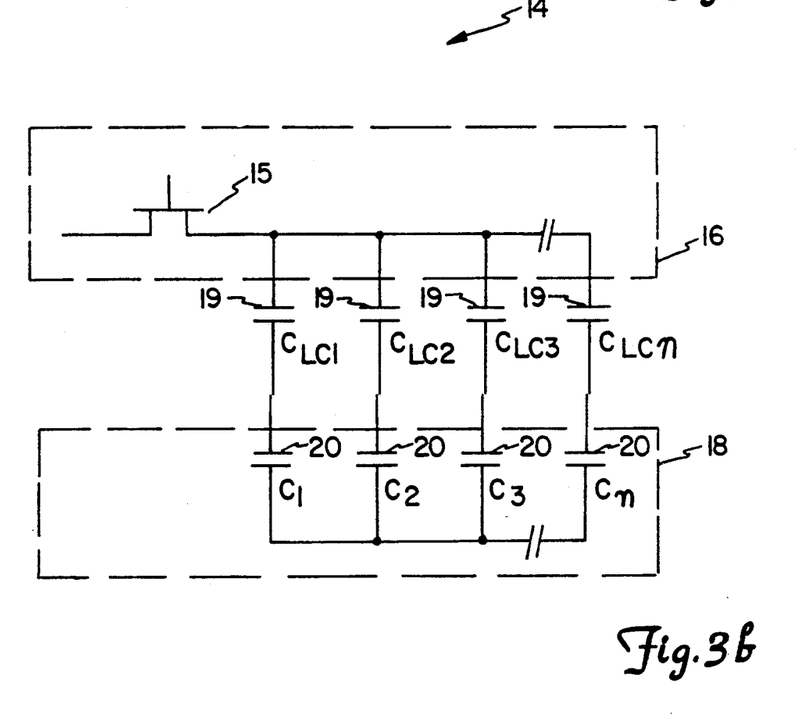

FIGS. 3a and 3b show a schematic of active matrix array 12 and electrical equivalent 14 of a pixel, according to the present invention. TFTs 15 and control capacitors 20 are fabricated on two separate substrates 16 and 18, respectively. Active matrix array 12 is fabricated on substrate 16 and control capacitor array 20 is fabricated on common electrode substrate 18. The fabrication of active matrix substrate 16 is conventional and thus can be designed and manufactured under optimum conditions for high performance and yield. Active matrix array 12 may be fabricated using a-Si TFTs, poly-Si TFTs or the like. Control capacitors 20 are fabricated on common electrode substrate 18 under optimum conditions for precise predetermined values of the control capacitor 20 capacitances and production yield.

Figure 4:
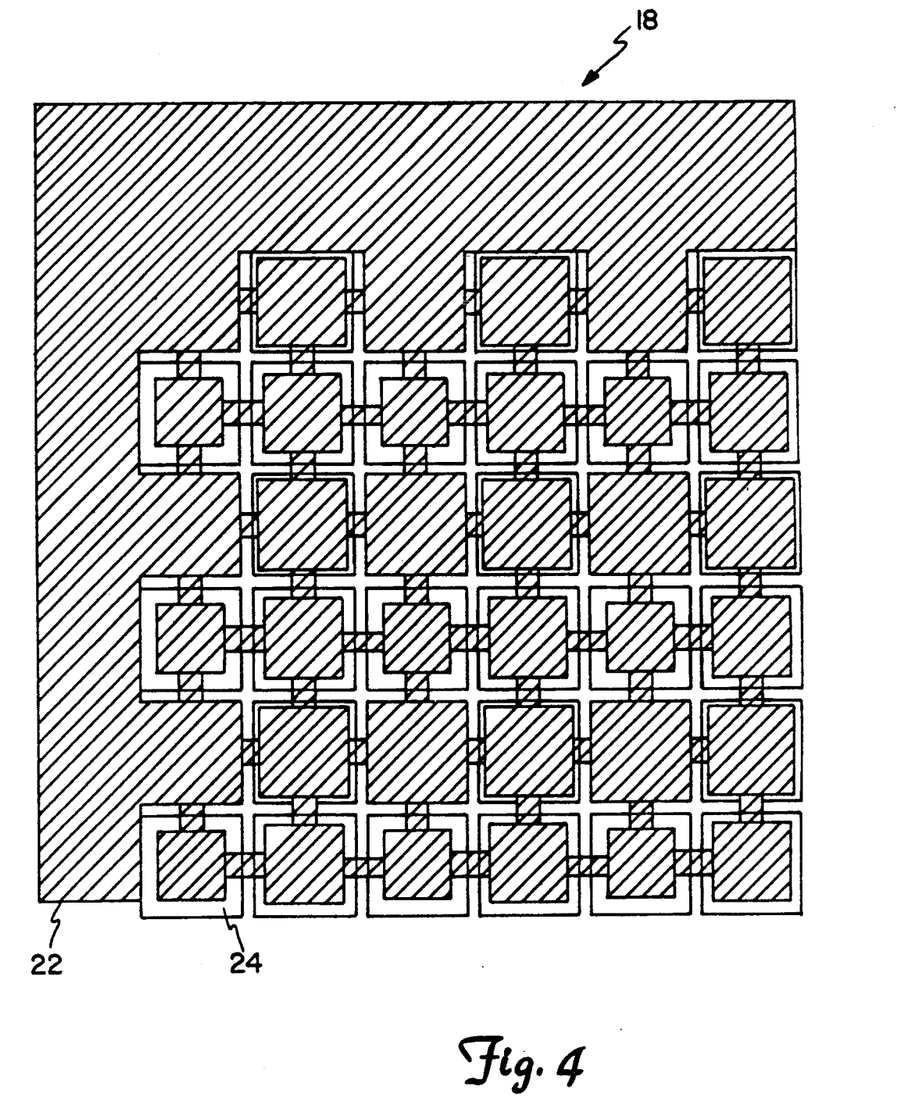
FIG. 4 is a pattern of the common electrode substrate.
Figure 5:
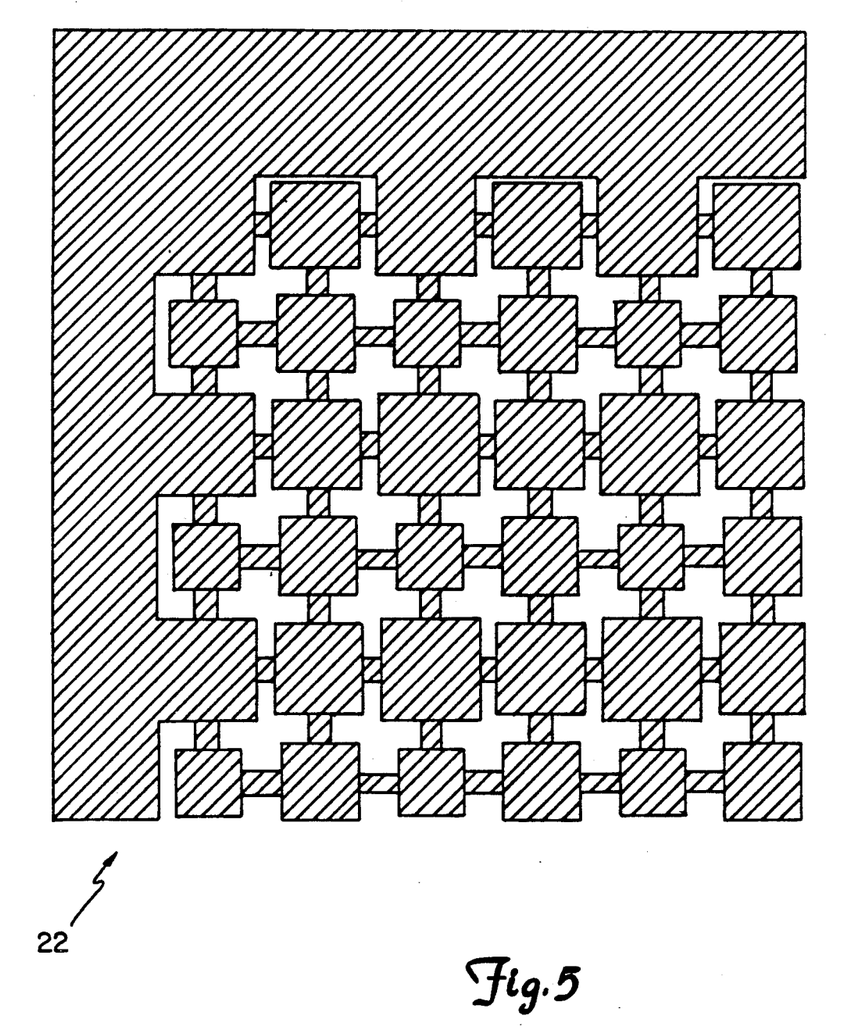
FIG. 5 is the first ITO layer pattern in the fabrication of the common electrode substrate.
Figure 6:
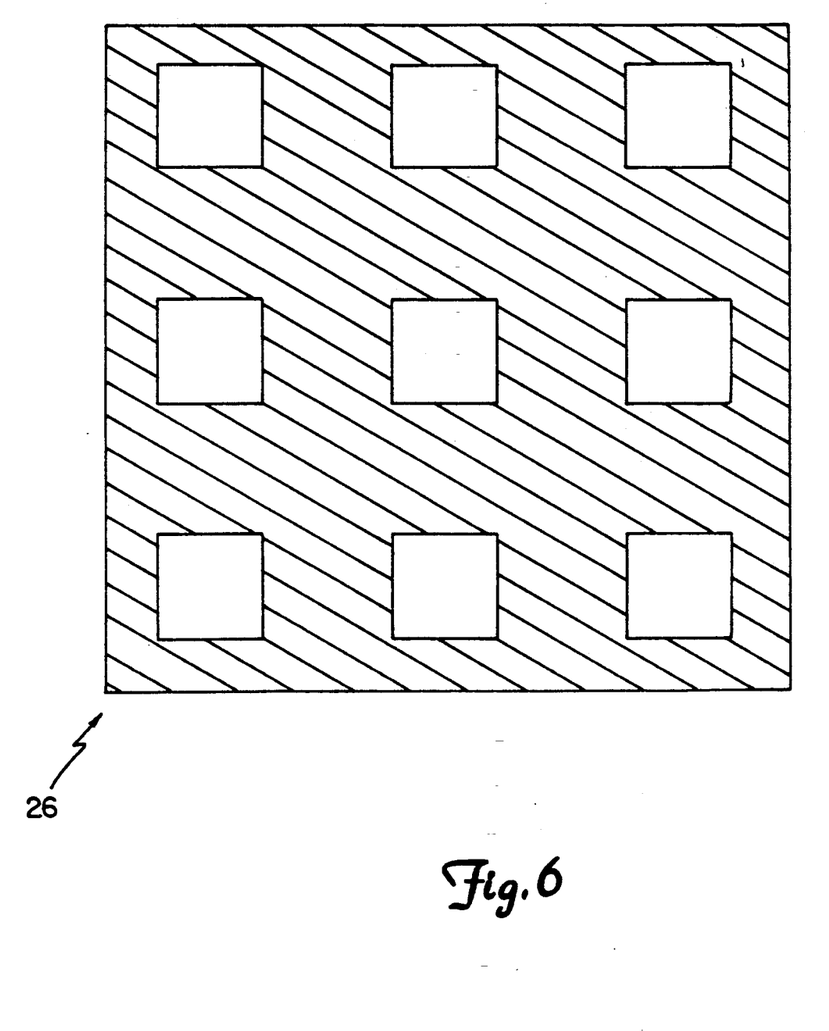
FIG. 6 reveals the pattern in the dielectric layer for the control capacitors.

FIG. 4 shows the schematic of common electrode substrate 18. Each corresponding pixel is divided into four subpixels. An overlay of three thin film layers used to fabricate control capacitors 20 is revealed in FIG. 4. Hatched portion 22 represents the first indium tin oxide (ITO) pattern on the common electrode substrate. First pattern 22 is separately illustrated in FIG. 5. Plane pattern 24 indicates the second ITO pattern of series capacitors 20 on substrate 18. Pattern 24 is separately illustrated in FIG. 7. Between patterns 22 and 24 is a dielectric of pattern 26 as illustrated in FIG. 6.

Figure 7:
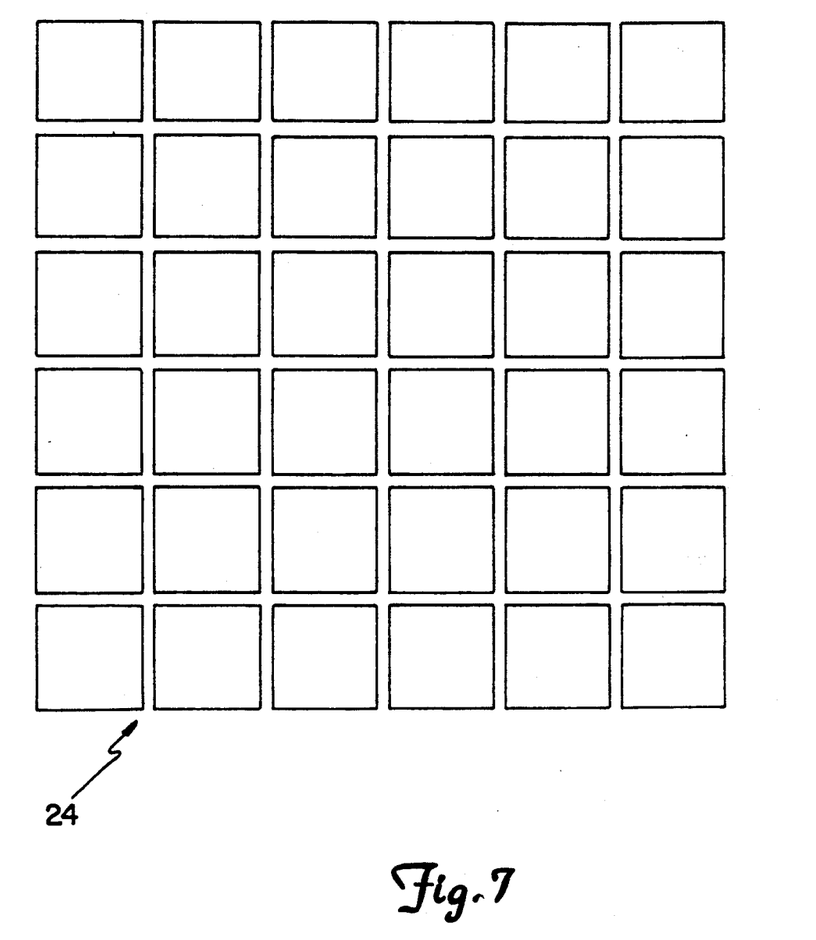
FIG. 7 reveals the second ITO layer pattern in the fabrication of the common electrode substrate.
Figure 13:
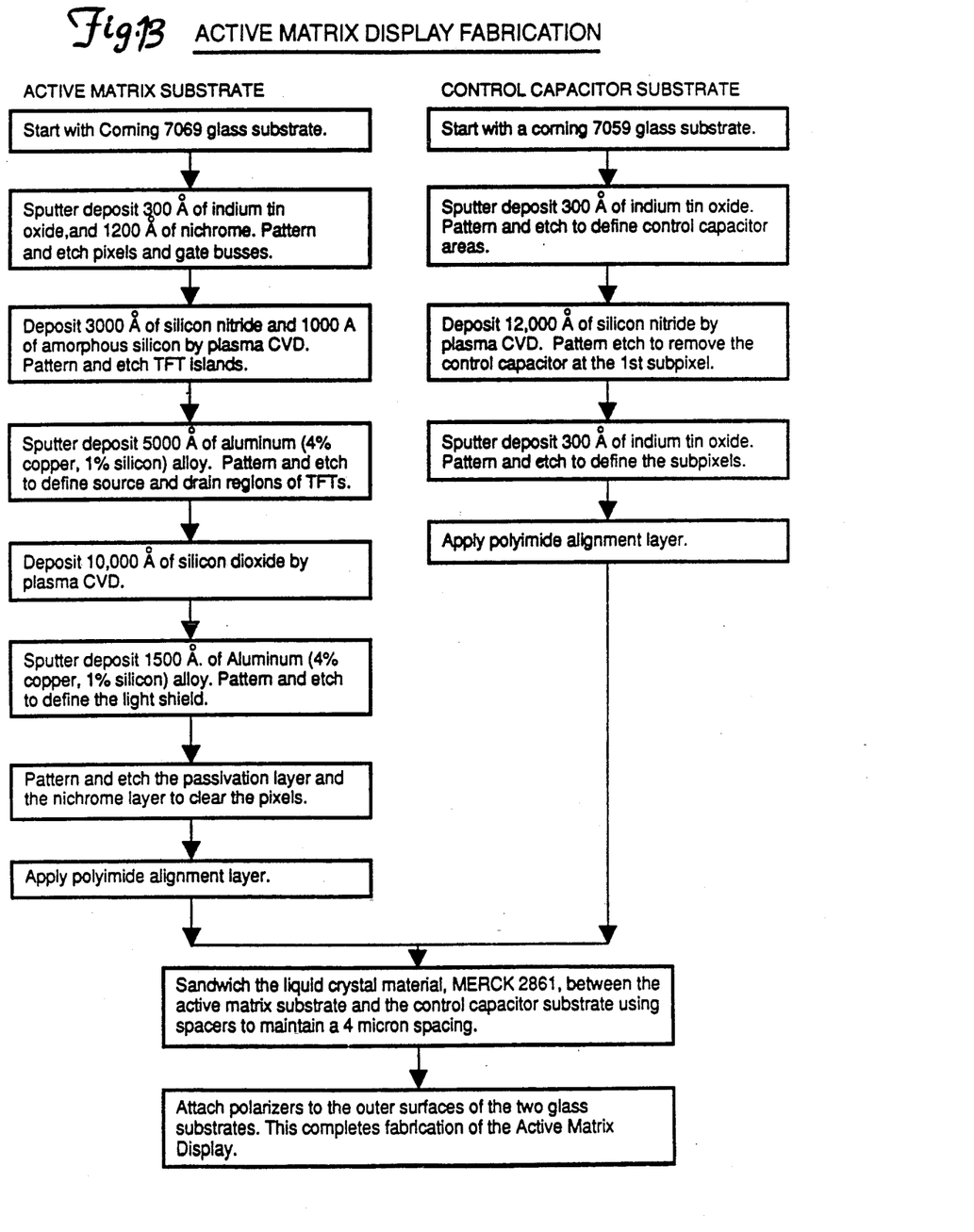
FIG. 13 is a diagram outlining the method of fabrication.

A method of fabrication is shown in FIG. 13. Substrate 18 is fabricated, starting with CORNING 7059 glass, according to the following steps: 1) Sputter deposit 300 angstroms of indium tin oxide (ITO) at 300° C. and anneal at 400° C., for 30 minutes. Photolithographically pattern and etch to define the area of control capacitors 20 as shown in FIG. 5. Thus, this ITO 22 layer serves as a common electrode as well as to define the control capacitor 20 areas. 2) Plasma deposit 12,000 angstroms of silicon nitride dielectric. Photolithographically pattern and etch as shown in FIG. 6. This pattern serves to remove a series control capacitor in one of the subpixels in the pixel. This subpixel will be the first one to turn-on, as the source voltage of the TFT is increased. 3) Sputter deposit a second ITO layer, 300 angstroms thick, at 300° C., and anneal at 400° C., for 30 minutes. Photolithographically pattern and etch to define the subpixels as shown in FIG. 7. The above process completes the fabrication of control capacitors 20 on common electrode substrate 18.

Figure 8A:
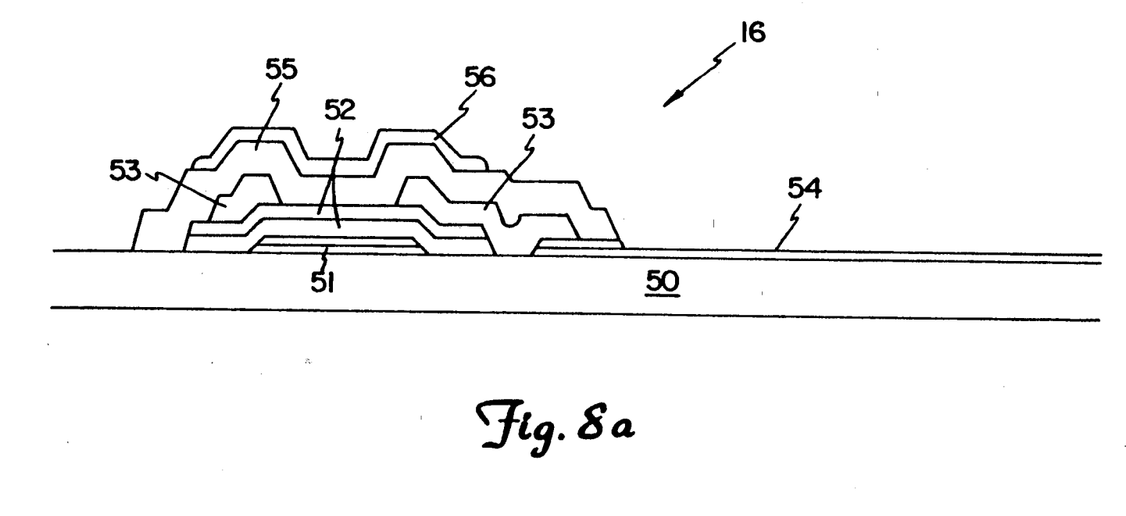
FIGS. 8a and 8b show a cross-section through a TFT at a pixel and a plan view of the pixel and the TFT, respectively.
Figure 8B:
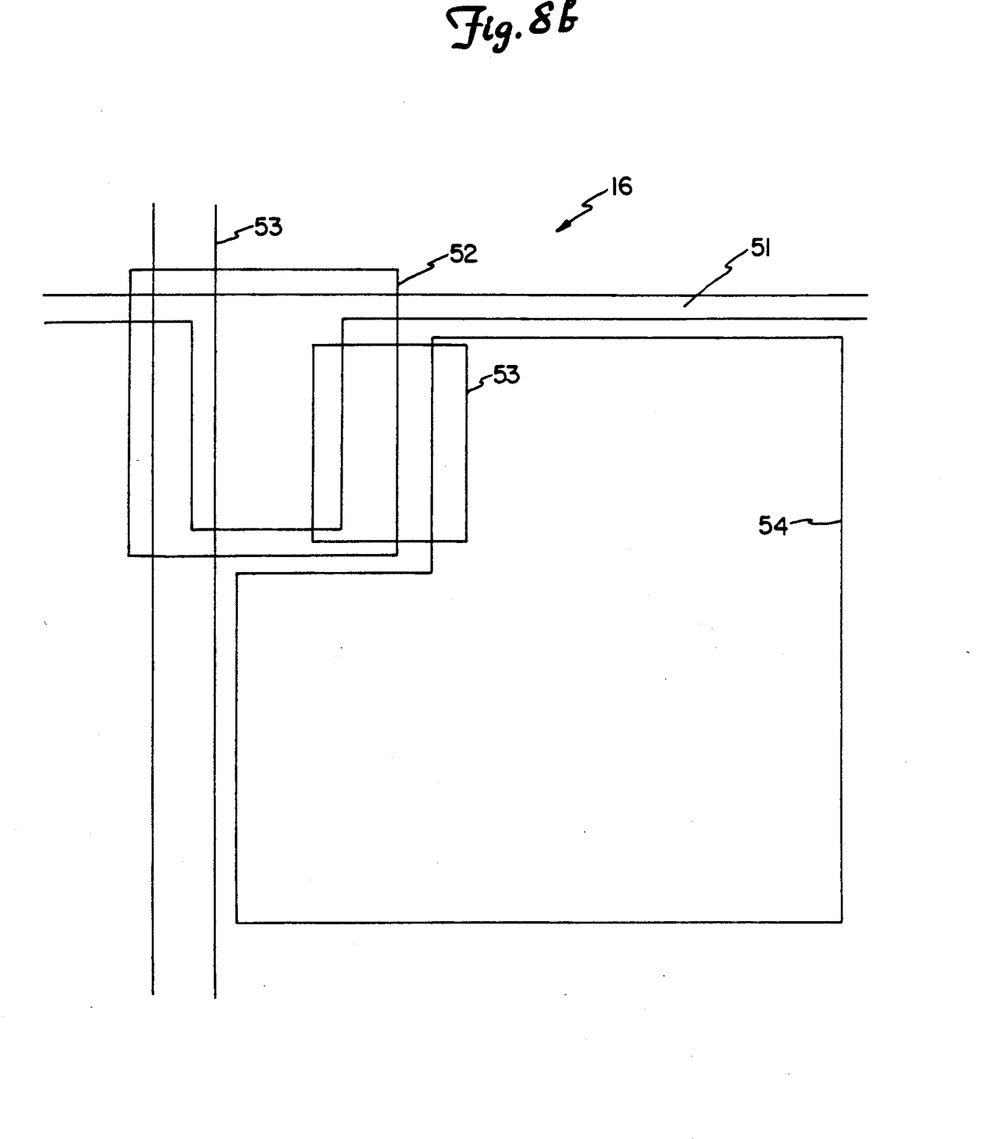

Active matrix substrate 16 is fabricated conventionally under optimum conditions to obtain high process yields. An a-Si TFT with an inverted staggered structure is employed in the active matrix substrate 16 as shown in FIGS. 8a and 8b. FIG. 8a shows a cross-section through the TFT at a pixel. FIG. 8b shows the plan view of a pixel with the TFT. Substrate 16 is fabricated, starting with CORNING 7059 glass 50, according to the following steps: 1) Sputter deposit 300 angstroms of indium tin oxide (ITO) at 300° C. and anneal at 400° for thirty minutes. Let the substrate cool to 300° C., and sputter deposit 1200 angstroms of nichrome. Photolithographically pattern and etch the nichrome and the ITO to define pixels 54 and gate busses 51. 2) Deposit 3000 angstroms of silicon nitride and 1000 angstroms of amorphous silicon sequentially by plasma enhanced chemical vapor deposition (PECVD) at 250° C. Photolithographically pattern and etch the silicon nitride and the amorphous silicon to define transistor islands 52. 3) Sputter deposit 5000 angstroms of aluminum alloy (4% copper and 1% silicon). Photolithographically pattern and etch the aluminum alloy to define source 53 and drain 53. 4) Deposit 10,000 angstroms of silicon dioxide for a passivation layer by PECVD at 250° C. 5) Sputter deposit 1500 angstroms of aluminum alloy for a light shield. 6) Photolithographically pattern and etch light shield layer 56. 7) Photolithographically pattern and etch passivation layer 55 to clear pixels 54, and then etch the nichrome from pixels 54. Light shield layer 56 and passivation layer 55 are not shown in FIG. 8b for the sake of clarity. The above process completes the fabrication of active matrix substrate 16.

Figure 9:
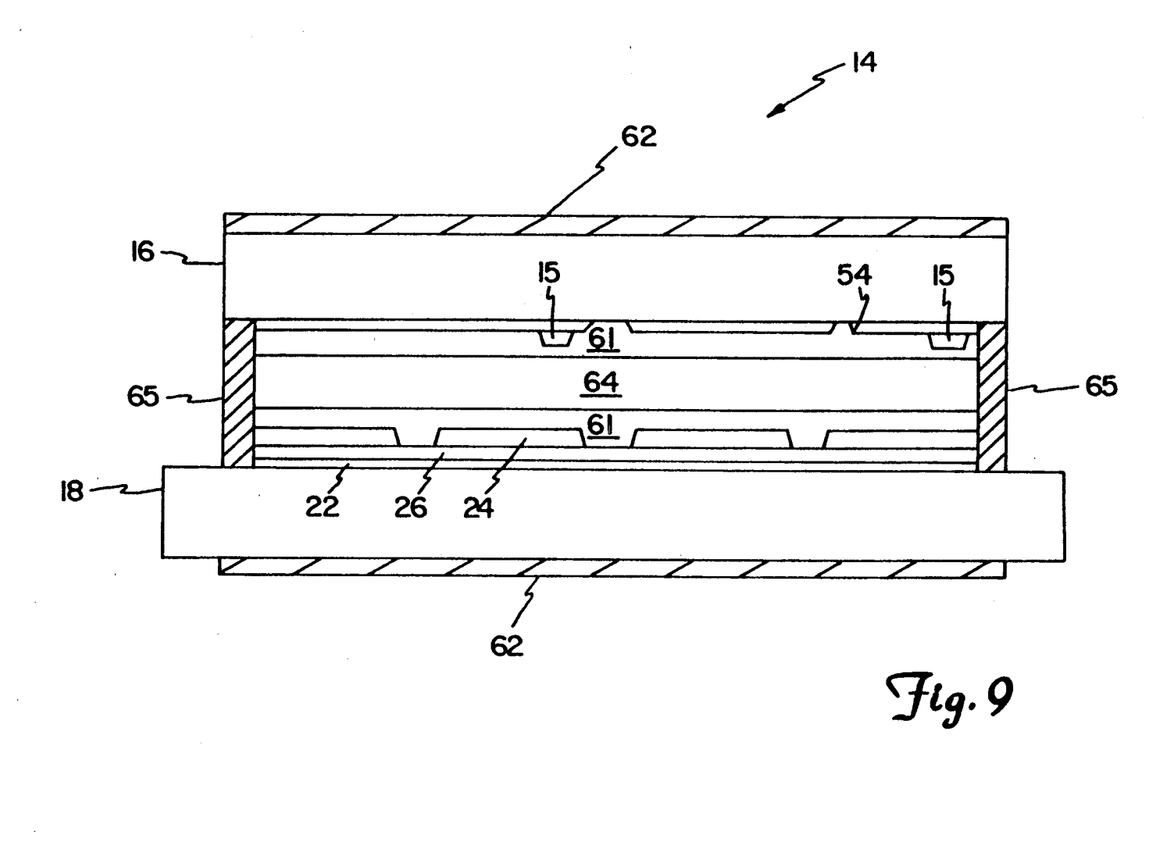
FIG. 9 is a cross-section of liquid crystal material sandwiched between an active matrix substrate and a common electrode substrate, using spacers for maintaining desired cell spacing.
Figure 10:
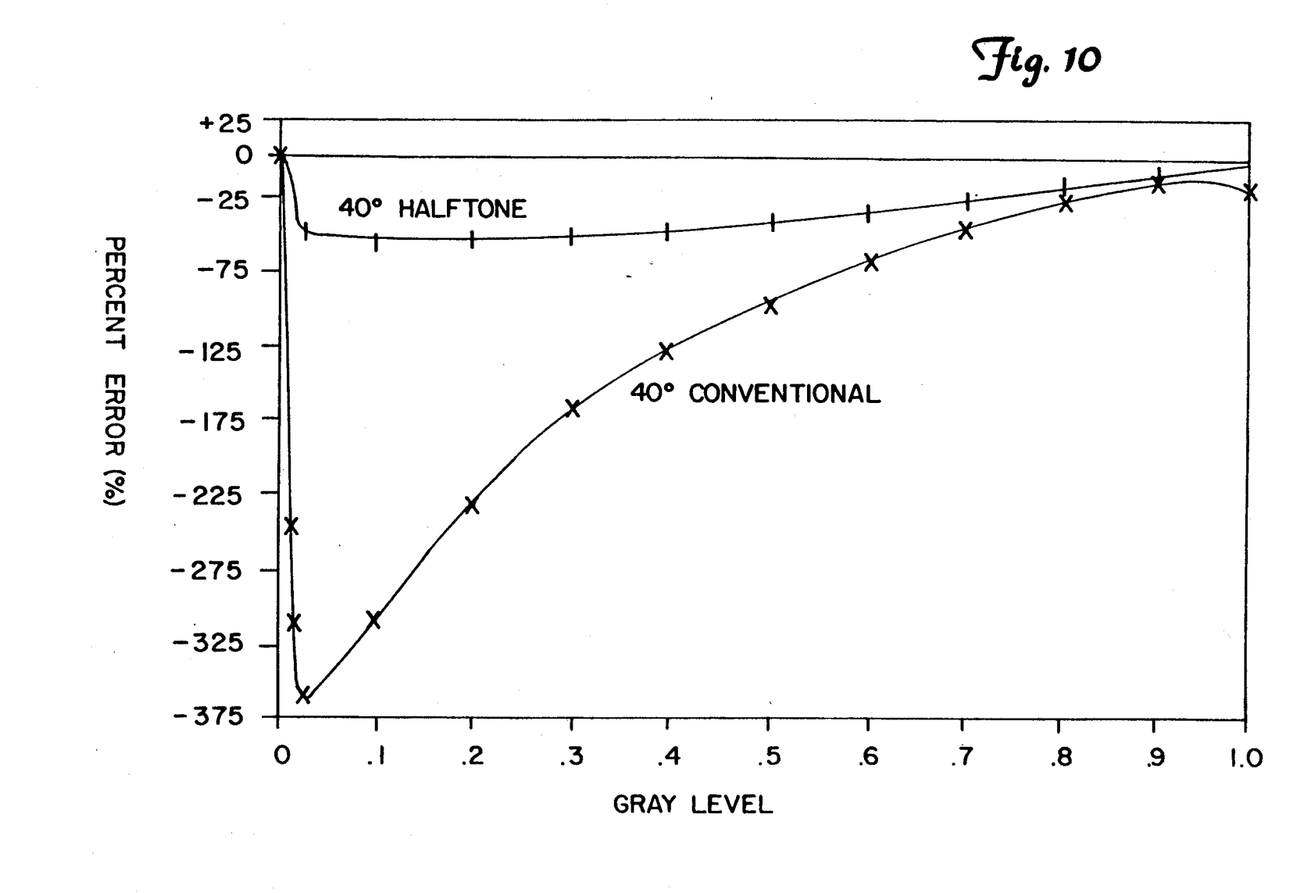
FIG. 10 is a comparison of grayscale errors of the present invention and the conventional related art, for a 40 degree viewing angle.

Active matrix display 14 is then assembled as shown in FIG. 9. FIG. 9 shows liquid crystal material 64 sandwiched between active matrix substrate 16 and common electrode substrate 18, using spacers 65 to maintain the desired cell spacing. A MERCK 2861 liquid crystal material is employed in display 14 with a cell spacing of 4 microns. Liquid crystal alignment layer 61 on both substrates is created by a mechanically rubbed polyimide layer. Polarizers 62 are attached to the outer surfaces of display 14 (i.e., the outer surfaces of substrates 16 and 18) in a parallel orientation. Assembled display 14 is then tested for grayscale errors as a function of viewing angle. A substantial improvement in grayscale accuracy has been observed in halftone display 14 when compared to a conventional display. For instance, for a 40 degree viewing angle, the grayscale errors, as shown in FIG. 10, were better than −50% for halftone display 14, whereas they were as high as −350% for a conventional display.

Figure 11:
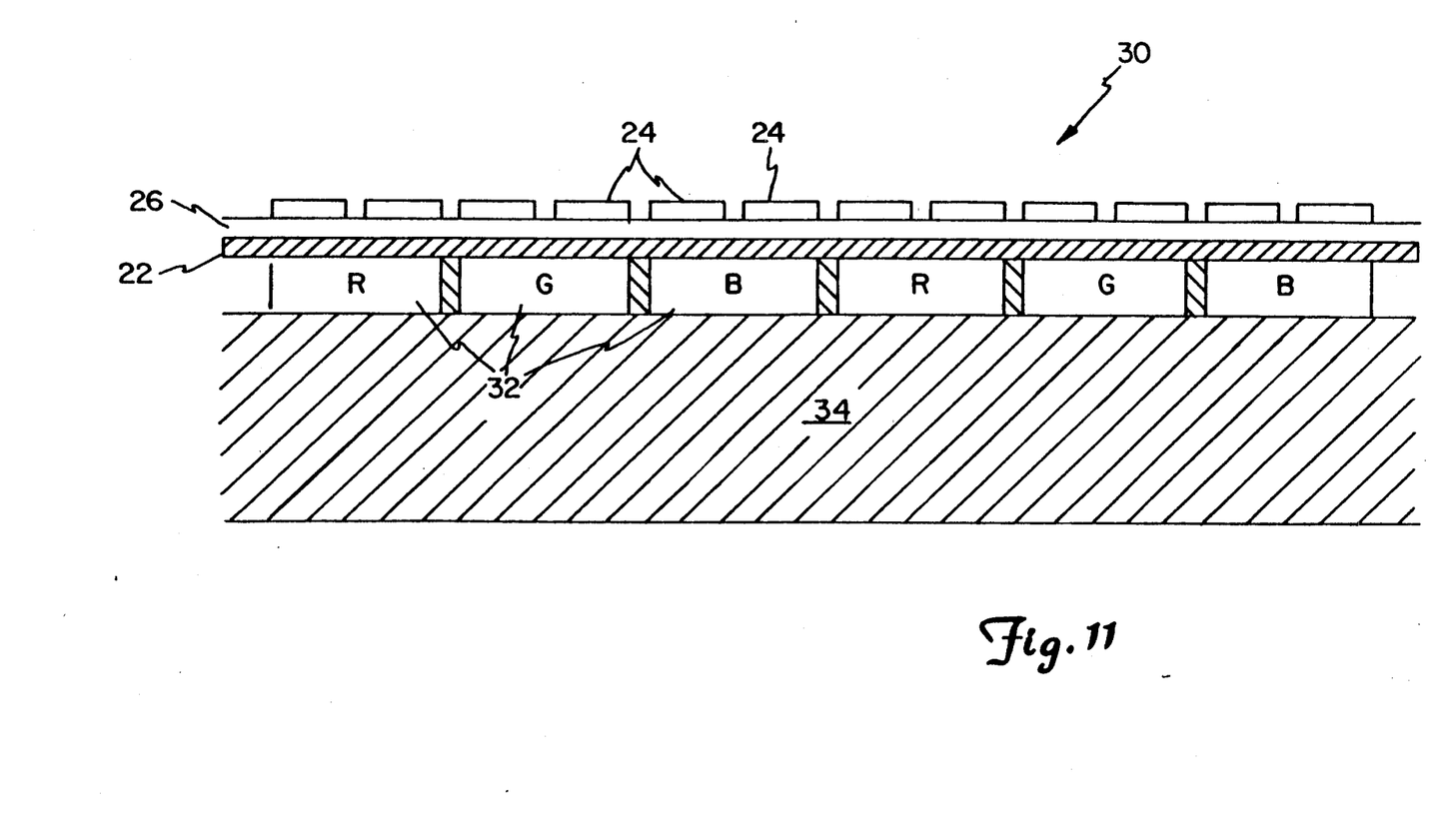
FIG. 11 shows an embodiment of the invention with color filters.

FIG. 11 shows a cross-section of a completely fabricated common electrode substrate 30 of the invention, using color filters 32 for full-color operation. The cross-section reveals a common electrode substrate containing color filter array 32, as well as a control capacitor 20 array composing first ITO pattern 22, dielectric 26, and second ITO pattern 24, as set on glass substrate 34. The electrodes are part of pattern 24 and define the subpixels. Active matrix substrate 16 is registered with respect to pattern 24, during the display 14 assembly, with the liquid crystal material.

Figure 12:
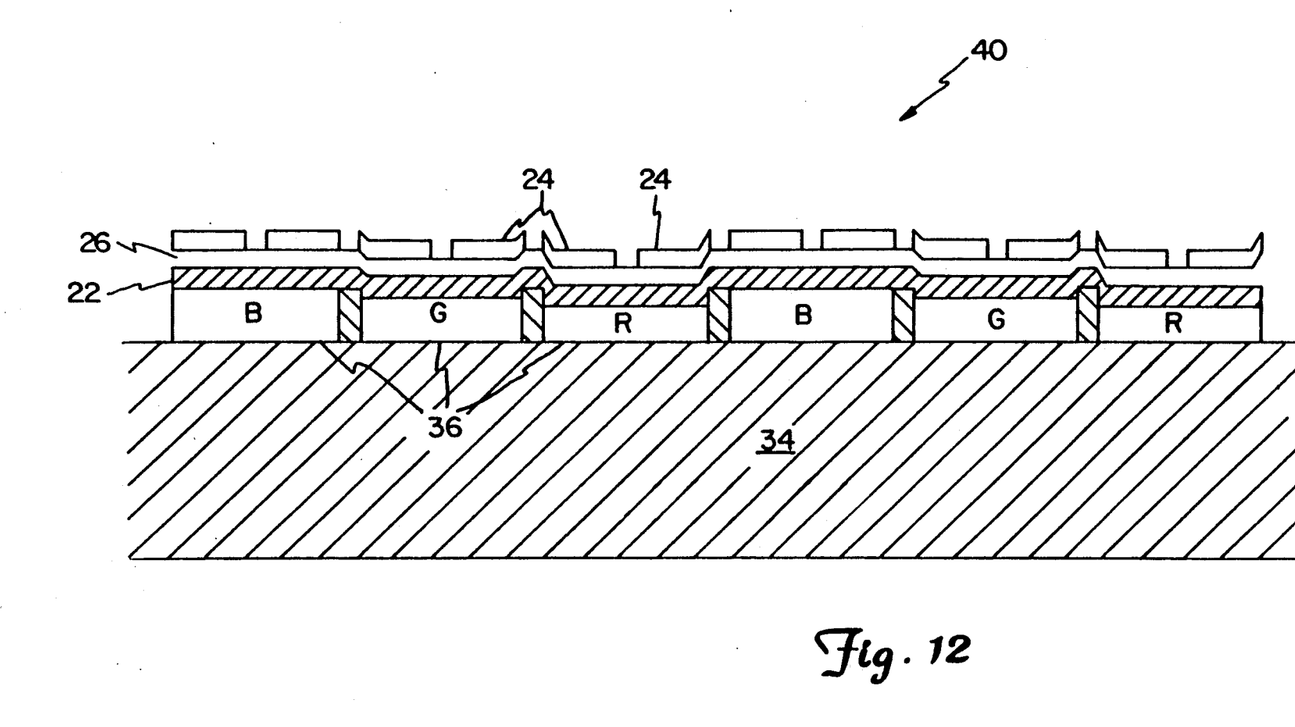
FIG. 12 shows an embodiment of the invention with variable-thickness, color filters for variable cell gap displays.

FIG. 12 shows common electrode substrate 40 using color filters 36 with various thicknesses. The cross-section through the common electrode substrate is revealed. The thickness variation of color filters 36 results in a variation of the liquid crystal cell thickness for different colors for enhanced contrast. Other structural features of display 40 are like those of common electrode substrate 30.

It is thus seen from the foregoing that there is provided a structure and method for manufacturing wide viewing angle, active matrix displays with halftone grayscale with high performance, high manufacturing yield, and low cost. The foregoing detailed description is intended to be exemplary rather than limiting, and the description sets forth the best mode contemplated by the inventor of carrying out his invention. Numerous modifications and variations to the present invention will be obvious to those skilled in the art without deviating from the spirit of the invention. Accordingly, all such variations and modifications to present invention are deemed to fall within the scope of the present invention.

I claim:

1. A method for fabricating a wide viewing angle, active matrix liquid crystal display having pixels, constituent subpixels and a halftone grayscale, comprising:

fabricating a control capacitor array on a first glass substrate, having capacitors connected to subpixels, wherein said fabricating the control capacitor array comprises:
depositing a first indium tin oxide layer on glass;
annealing the indium tin oxide layer;
etching the first indium tin oxide layer with a first pattern defining a first electrode of the control capacitor array;
depositing a silicon nitride layer on the first indium tin oxide layer wherein the silicon nitride layer defines a dielectric for the control capacitor array;
etching the silicon nitride layer with a second pattern, thereby removing one of the control capacitors in one of the subpixels of each pixel;
depositing a second indium tin oxide layer defining a second electrode of the control capacitor array and a first electrode of a liquid crystal display capacitance;
annealing the second indium tin oxide layer; and
etching the second indium tin oxide layer with a third pattern defining areas corresponding to the subpixels;

fabricating an active matrix on a second glass substrate having transistors and the pixels wherein each pixel defines a second electrode of the liquid crystal display capacitance; and juxtapositioning the control capacitor array on the first glass substrate next to the active matrix on the second glass substrate, wherein between the second indium tin oxide layer and the active matrix is a liquid crystal material which defines a dielectric of the liquid crystal display capacitance.

2. Method of claim 1 wherein said juxtapositioning comprises:
using spacers placed between the capacitor array and the active matrix to maintain a cell spacing;
aligning the liquid crystal material on the first glass substrate and the second glass substrate through use of a rubbed-polyimide layer; and
attaching polarizers to outer surfaces of the first and second glass substrates.

3. Method of claim 2 wherein:
the aluminum alloy contains 4 percent copper and 1 percent silicon; and
the etching of the first, second and third patterns is effected by photolithography.

4. Method of claim 3 further comprising inserting color filters between the first substrate and the first indium tin oxide layer, for full color operation of said display.

5. Method of claim 4 further comprising varying the thicknesses of the color filters for enhancing contrasts of said display.

6. A method for fabricating a wide viewing angle, active matrix liquid crystal display having halftone grayscale, comprising:

fabricating a control capacitor array on a first substrate, having capacitors connected in series to subpixels, wherein said fabricating the control capacitor array comprises:

sputter depositing about 300 angstroms of a first indium tin oxide layer on glass, at about 300 degrees Centigrade;

annealing the indium tin oxide at about 400 degrees Centigrade for about 30 minutes;

making a first pattern on the first indium tin oxide layer defining the control capacitor array;

etching the first pattern;

plasma depositing about 12,000 angstroms of silicon nitride dielectric on the first indium tin oxide layer;

making a second pattern that serves to remove one of the control capacitors in one of subpixels for each pixel;

etching the second pattern;

sputter depositing about 300 angstroms of a second indium tin oxide layer on the silicon nitride dielectric at about 300 degrees Centigrade;

annealing the second indium tin oxide layer at about 400 degrees Centigrade for about 30 minutes;

making a third pattern defining electrodes which form the subpixels on the second indium tin oxide layer; and etching the third pattern;

fabricating an active matrix on a second substrate, having pixels and thin film transistors for switching the pixels, wherein said fabricating the active matrix comprises:

sputter depositing an approximately 300 angstrom indium tin oxide layer at about 300 degrees Centigrade on a glass sheet;

annealing the indium tin oxide layer at about 400 degrees Centigrade for about 30 minutes;

sputter depositing an approximately 1200 angstrom nichrome layer on the indium tin oxide layer;

making a first pattern on the nichrome layer and the indium tin oxide layer to define pixels and gate busses;

etching the first pattern;

plasma-enhanced-chemical-vapor depositing an approximately 3000 angstrom silicon nitride layer on the nichrome layer at about 250 degrees Centigrade;

plasma-enhanced-chemical-vapor depositing an approximately 1000 angstrom amorphous silicon layer on the silicon nitride layer at about 250 degrees Centigrade;

making a second pattern on the amorphous silicon layer and the silicon layer to define islands for the thin film transistors;

etching the second pattern;

sputter depositing an approximately 5000 angstrom aluminum alloy layer on the amorphous layer;

making a third pattern on the aluminum alloy layer to define sources and drains for the thin film transistors;

etching the third pattern;

plasma-enhanced-chemical-vapor depositing an approximately 10,000 angstrom silicon dioxide passivation layer at about 250 degrees Centigrade on the aluminum alloy layer;

sputter depositing an approximately 1500 angstrom aluminum alloy light shield layer on the passivation layer;

making a fourth pattern on the light shield layer;

etching the fourth pattern;

making a fifth pattern on the passivation layer; and etching the fifth pattern to clear the pixels from the passivation and nichrome layers; and sandwiching liquid crystal material between the first and second substrate which are brought together to form the active matrix liquid crystal display.

* * * * *